(12) United States Patent
Palaka et al.

(10) Patent No.: US 11,410,125 B2
(45) Date of Patent: Aug. 9, 2022

(54) SYSTEMS AND METHODS FOR DYNAMICALLY DETERMINING WEARABLE ITEMS FOR A SUBSCRIPTION ELECTRONICS TRANSACTIONS PLATFORM

(71) Applicant: CaaStle, Inc., New York, NY (US)

(72) Inventors: Kondalarao Palaka, Fremont, CA (US); Georgiy Goldenberg, Los Altos, CA (US); Dongming Jiang, Los Angeles, CA (US)

(73) Assignee: CaaStle, Inc., New York, NY (US)

( * ) Notice: Subject to any disclaimer, the term of this patent is extended or adjusted under 35 U.S.C. 154(b) by 0 days.

(21) Appl. No.: 17/187,941

(22) Filed: Mar. 1, 2021

(65) Prior Publication Data

US 2021/0312380 A1    Oct. 7, 2021

Related U.S. Application Data

(63) Continuation of application No. 16/358,150, filed on Mar. 19, 2019.

(51) Int. Cl.
*G06Q 50/28* (2012.01)
*G06Q 30/02* (2012.01)
(Continued)

(52) U.S. Cl.
CPC ......... *G06Q 10/087* (2013.01); *G06F 16/288* (2019.01); *G06Q 10/06314* (2013.01); *G06Q 10/06375* (2013.01); *G06Q 30/0202* (2013.01); *G06Q 30/0625* (2013.01); *G06Q 30/0639* (2013.01); *G06F 16/212* (2019.01)

(58) Field of Classification Search
CPC ........... G06Q 10/087; G06Q 10/06314; G06Q 10/06375; G06Q 30/0625; G06F 16/288; G06F 16/212
See application file for complete search history.

(56) References Cited

U.S. PATENT DOCUMENTS 7,092,929 B1    8/2006  Dvorak et al.
9,865,010 B2 *  1/2018  Borders ............. G06Q 10/0837
(Continued)

FOREIGN PATENT DOCUMENTS

WO    WO 2014/074072 A1    5/2014
WO    WO 2016/044875 A1    3/2016

*Primary Examiner* — Talia F Crawley
(74) *Attorney, Agent, or Firm* — Bookoff McAndrews, PLLC

(57) ABSTRACT

Disclosed are methods, systems, and non-transitory computer-readable medium for dynamically assorting merchandise. For example, a method may include receiving or generating a plurality of cells defined by one or more dimensions, receiving a total number of resources for allocation to the plurality of cells, allocating the total number of resources among the plurality of cells, determining one or more stock keeping units for each cell, determining a quantity of each of the one or more stock keeping units in each cell, assigning one or more launch dates for each of the one or more stock keeping units for each cell, and stocking the one or more inventories with one or more articles corresponding to the stock keeping units in each cell, based on the determined quantity and the assigned one or more launch dates of each of the stock keeping units in each cell.

20 Claims, 4 Drawing Sheets

(51) Int. Cl.
  *G06Q 10/08*   (2012.01)
  *G06Q 30/06*   (2012.01)
  *G06F 16/28*   (2019.01)
  *G06Q 10/06*   (2012.01)
  *G06F 16/21*   (2019.01)

(56) References Cited

U.S. PATENT DOCUMENTS

| | | | | |
|---|---|---|---|---|
| 10,315,897 B2* | 6/2019 | High | ............... | G05D 1/0289 |
| 2002/0045959 A1* | 4/2002 | Van Overveld | ........ | G06Q 30/02 |
| | | | | 700/90 |
| 2008/0255920 A1* | 10/2008 | Vandergrift | ........ | G06Q 30/0601 |
| | | | | 705/26.1 |
| 2009/0210324 A1* | 8/2009 | Bhogal | ............... | G06Q 10/087 |
| | | | | 705/28 |
| 2013/0151371 A1 | 6/2013 | Moss | | |
| 2014/0021257 A1* | 1/2014 | Irie | ............... | G06K 7/1408 |
| | | | | 235/462.07 |
| 2014/0180864 A1* | 6/2014 | Orlov | ............... | G06Q 30/0631 |
| | | | | 705/26.7 |
| 2014/0344102 A1* | 11/2014 | Cooper | ............... | G06Q 30/0631 |
| | | | | 705/26.7 |
| 2017/0228744 A1* | 8/2017 | Booth | ............... | G06Q 30/0639 |
| 2017/0262873 A1* | 9/2017 | Atchley | ............... | G06Q 50/01 |
| 2018/0053142 A1* | 2/2018 | Martin | ............... | G06N 20/00 |
| 2019/0108571 A1* | 4/2019 | Kar | ............... | G06Q 30/0255 |
| 2020/0302378 A1* | 9/2020 | Palaka | ............... | G06Q 10/06375 |

\* cited by examiner

SYSTEMS AND METHODS FOR DYNAMICALLY DETERMINING WEARABLE ITEMS FOR A SUBSCRIPTION ELECTRONICS TRANSACTIONS PLATFORM

CROSS-REFERENCE TO RELATED APPLICATION(S)

This patent application is a continuation of and claims the benefit of priority to U.S. Nonprovisional patent application Ser. No. 16/358,150, filed on Mar. 19, 2019.

TECHNICAL FIELD

Various embodiments of the present disclosure generally relate to dynamically assorting merchandise, and more particularly, to assorting one or more inventories using dynamic and computer-implemented optimizations for purchase, rental, or subscription-based online transactions of wearable items.

BACKGROUND

Data-driven optimization models can configure computing systems to automatically solve complex problems, such as resource allocation tasks that take into account multiple dimensions, attributes, costs, and constraints. Implementing such models on computing systems can also generate more optimal solutions than those produced by manual processes, especially when the computer-implemented models employ unique and rule-based optimization algorithms that are different in nature than the manual techniques sought to be used for solving similar problems. For example, data-driven optimization models often employ objective and structured approaches that eliminate human subjectivity, enhancing the speed and accuracy of the process. Accordingly, using data-driven optimization models executed in a computing environment, a process in which (i) data are received, (ii) the data are placed into dashboards, (iii) the dashboards receive human insight, and (iv) solution is generated incorporating the subjective insights, may be fundamentally transformed into an automated process in which (i) data are received and (ii) a more optimal solution is generated without a need for the intervening steps.

A preferred environment for implementing such a model is one in which a sufficient volume of data may be fed into the models to produce accurate results. Thus, it may be highly desirable for an online retail, subscription, or rental service provider, to leverage the collected electronic data for executing computer-implemented, uniquely customized, and data-driven optimization models to allocate resources in one or more inventories while considering various dimensions and complex constraints associated therewith.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed to dynamically assorting merchandise for optimizing one or more inventories associated with electronic transactions platform.

In one embodiment, a computer-implemented method is disclosed for dynamically assorting merchandise. The computer-implemented method may comprise: receiving or generating, in one or more electronic databases, a plurality of cells defined by one or more dimensions, the one or more dimensions each associated with item attributes of a plurality of wearable items to be assorted in one or more inventories, wherein each cell of the plurality of cells includes one or more cell values associated with the one or more dimensions; receiving, by one or more processors, a total number of resources for allocation to the plurality of cells; allocating, by the one or more processors, the total number of resources among the plurality of cells, to generate a number of resources corresponding to each cell of the plurality of cells; based on the number of resources corresponding to each cell, determining, by the one or more processors, one or more stock keeping units for each cell; determining, by the one or more processors, a quantity of each of the one or more stock keeping units in each cell; assigning, by the one or more processors, one or more launch dates for each of the one or more stock keeping units for each cell; and stocking the one or more inventories with one or more articles corresponding to the stock keeping units in each cell, based on the determined quantity and the assigned one or more launch dates of each of the stock keeping units in each cell.

In accordance with another embodiment, a computer system is disclosed for dynamically assorting merchandise. The computer system may comprise: a memory having processor-readable instructions stored therein; and at least one processor configured to access the memory and execute the processor-readable instructions, which when executed by the at least one processor configures the at least one processor to perform a plurality of functions, including functions for: receiving or generating, in one or more electronic databases, a plurality of cells defined by one or more dimensions, the one or more dimensions each associated with item attributes of a plurality of wearable items to be assorted in one or more inventories, wherein each cell of the plurality of cells includes one or more cell values associated with the one or more dimensions; receiving a total number of resources for allocation to the plurality of cells; allocating the total number of resources among the plurality of cells, to generate a number of resources corresponding to each cell of the plurality of cells; based on the number of resources corresponding to each cell, determining one or more stock keeping units for each cell; determining a quantity of each of the one or more stock keeping units in each cell; assigning one or more launch dates for each of the one or more stock keeping units for each cell; and stocking the one or more inventories with one or more articles corresponding to the stock keeping units in each cell, based on the determined quantity and the assigned one or more launch dates of each of the stock keeping units in each cell.

In accordance with another embodiment, a non-transitory computer-readable medium containing instructions is disclosed for dynamically assorting merchandise. The non-transitory computer-readable medium may comprise instructions for: receiving or generating, in one or more electronic databases, a plurality of cells defined by one or more dimensions, the one or more dimensions each associated with item attributes of a plurality of wearable items to be assorted in one or more inventories, wherein each cell of the plurality of cells includes one or more cell values associated with the one or more dimensions; receiving a total number of resources for allocation to the plurality of cells; allocating the total number of resources among the plurality of cells, to generate a number of resources corresponding to each cell of the plurality of cells; based on the number of resources corresponding to each cell, determining one or more stock keeping units for each cell; determining a quantity of each of the one or more stock keeping units in each cell; assigning one or more launch dates for each of the one or more stock keeping units for each cell; and stocking the one or more inventories with one or more articles corresponding to the stock keeping units in each cell, based on the determined quantity and the assigned one or more launch dates of each of the stock keeping units in each cell.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
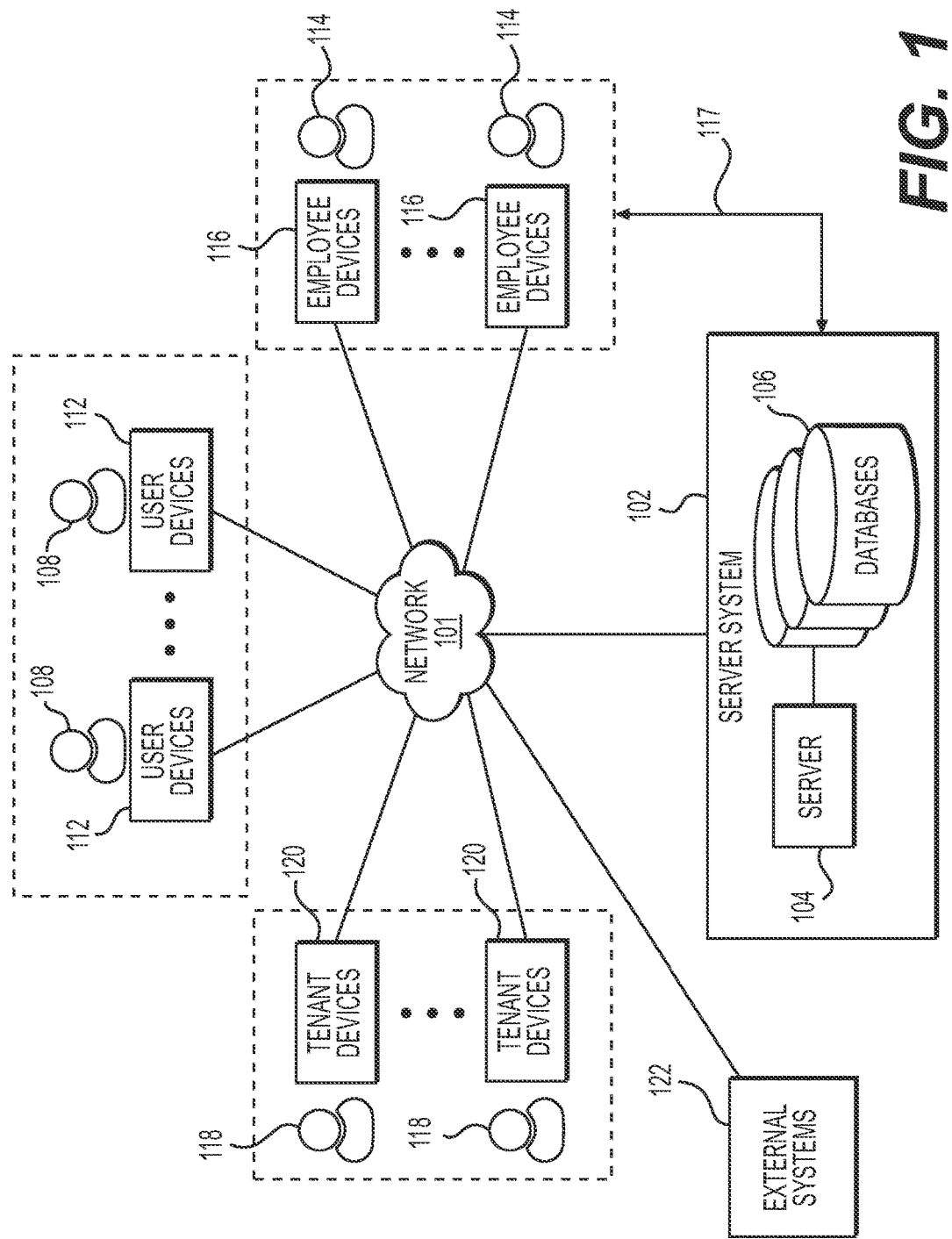
FIG. 1 depicts an example environment in which methods, systems, and other aspects of the present disclosure may be implemented.

The following embodiments describe systems and methods for dynamically assorting merchandise. As noted above, it may be highly desirable for an online retail, subscription, or rental service provider, to leverage the collected electronic data for executing computer-implemented, uniquely customized, and data-driven optimization models to allocate resources in one or more inventories while considering various dimensions and complex constraints associated therewith.

While the exemplary system architecture as described in the present disclosure relates to electronic transaction platform for subscribing to, purchasing, or renting wearable items (e.g., clothing-as-a-service (CaaS) or Try-Then-Buy (TTB) service), implementations disclosed herein may effectively serve various other online transaction platforms in the context of any other subscription, purchase, rental, or retail services without departing from the scope of the disclosure, such as, for example, a platform for making purchases of any product supplied from one or more physical inventories via electronic transactions. In addition, while some descriptions and examples disclosed in the present disclosure refer to certain exemplary transaction platforms or inventories as transactions or inventories pertaining to "apparel," "garments," or "CaaS" (i.e., clothing-as-a-service), all of those transactions and/or inventories may effectively serve any wearable item (e.g., an article of clothing, apparel, jewelry, hat, accessories, or any other product which may be worn), or even hospitality linens, consumer goods, or any other textile fabrics, without departing from the scope of the disclosure.

As used in the present disclosure, the term "CaaS" (i.e., clothing-as-a-service) may collectively refer to computer-implemented services and functions associated with sub-scription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the term "wearable item" may refer to any article of clothing, apparel, jewelry, hat, accessories, or other product which may be worn by a person, an animal, or a thing, or be used as an ornament for a person, an animal, or a thing. Further, as used in the present disclosure, the term "wearability" may refer to a propensity or a probability of one or more users actually wearing a given garment, and the term "wearability metric" may be a metric indicating a level of wearability. As used herein, the term "closeting" or "to closet" may refer to a computer-implemented operation of placing one or more garments into a virtual closet (e.g., a cart, a repository, or any type of space which may be virtually associated with a particular set of one or more garments for a future transaction). As used herein, the term "article identifier" may refer an identifier that is unique to a particular article of item available for CaaS, and "article identifier count" may refer to a quantity of article identifiers available in a set of articles.

In accordance with the present disclosure, user interfaces, periodically executed computer-implemented services, ad hoc services, and automations being integrated together in a connected platform may be achieved by a uniquely configured system architecture, job execution cluster configuring one or more processors to perform both storefront and back office tasks, and various user interfaces providing specialized or customized access to users of different roles. For example, the system may periodically collect vast amounts of data attributes from historical transactions, form data sets indicative of each user's relationship with certain apparel (e.g., a binary flag of whether a shipped garment was actually worn by a user) in the back end, and train a neural network with those data sets to make specific front-end user recommendations with highly wearable apparel. The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an example environment 100, according to one or more embodiments of the present disclosure. As shown, the example environment 100 may include one or more networks 101 which interconnects server system 102, user devices 112, employee devices 116, tenant devices 120, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and tenant devices 120 may be accessed by employees of tenant entities 118. In some implementations, employee devices 116 may be used to perform the functions of the tenant devices 120 and/or the user devices 112. Server system 102 may comprise one or more servers 104 and a one or more databases 106, which may be configured to store and/or process a plurality of data, microservices, and service components, and/or associated functions thereof, as described in more detail below with respect to FIGS. 2 and 3.

Users 108 may access the server system 102 through the one or more networks 101 by user devices 112. Each device among the user devices 112 may be any type of computing device (e.g., personal computing device, mobile computing devices, etc.) which allows users 108 to display a web browser or a web-based application for accessing the server system 102 through the network 101. The user devices 112 may, for example, be configured to display a web browser, a web-based application, or any other user interface for allowing users 108 to exchange information with other device(s) or system(s) in the environment 100 over the one or more networks 101. For example, a device among the user devices 112 may load an application with graphical user interface (GUI), and the application may display on the GUI one or more apparel recommendations for closeting by the user. Users 108 accessing user devices 112 may be, for example, users and/or potential users of apparel made available for subscription-based distribution via electronic transactions and physical shipment. Additionally, or alternatively, users 108 may access user devices 112 to, for example, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, personalized discovery, or recommendations.

Employee devices 116 may be configured to be accessed by one or more employees 114, including, for example, customer service employees, marketer employees, warehouse employees, analytics employees, or any other employees who are authorized and/or authenticated to perform tasks, operations, and/or transactions associated with the server system 102, and/or the external systems 122. Each device among the employee devices 116 may be any type of computing device (e.g., personal computing device, mobile computing devices, etc.). In one embodiment, employee devices 116 are owned and operated by the same entity or at least an affiliate of the entity operating the e-commerce (e.g., CaaS) business hosted on server systems 102. Each device among the employee devices 116 may be any type of computing device (e.g., personal computing device, mobile computing devices, etc.). The employee devices 116 may allow employees 114 to display a web browser or an application for accessing the server system 102 and/or the external systems 122, through the one or more networks 101. For example, a device among the one or more of the employee devices 116 may load an application with graphical user interface (GUI), and the application may display on the GUI one or more warehouse operations associated with providing CaaS to users 108. In some implementations, the employee devices 116 may communicate with the server system 102 via communications link 117. Additionally, or alternatively, the employee devices 116 may communicate with the server system 102 via network 101 (e.g., access by web browsers or web-based applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity that allocates and/or supplies one or more specific collections of apparel for the CaaS inventory. For example, each of the one or more tenants 118 may be a retailer, a designer, a manufacturer, a merchandizer, or a brand owner entity which supplies one or more collections of wearable items to the CaaS inventory managed and/or accessed by the server system 102. As described in more detail below with respect to FIG. 3, tenants 118 may use one or more electronic tenant interfaces (e.g., a catalog content management system associated with each tenant) to provide the server system 102 with wearable item data that describe apparel or wearable items made available for transactions. For example, one or more catalogs for each of the one or more tenants 118 may be generated and/or updated at the server system 102 dynamically and/or periodically. Tenant devices 120 may serve as access terminals for the tenants 118, for communicating with the electronic tenant interfaces and/or other subsystems at the server system 102. The tenant devices 120 may, for example, be configured to display a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. Specific examples of the external systems 122 are described in detail below with respect to FIGS. 2 and 3. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

As indicated above, FIG. 1 is provided merely as an example. Other examples that differ from the example environment 100 of FIG. 1 are contemplated within the scope of the present embodiments. In addition, the number and arrangement of devices and networks shown in system 100 are provided as an example. In practice, there may be additional devices, fewer devices and/or networks, different devices and/or networks, or differently arranged devices and/or networks than those shown in system 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

Figure 2:
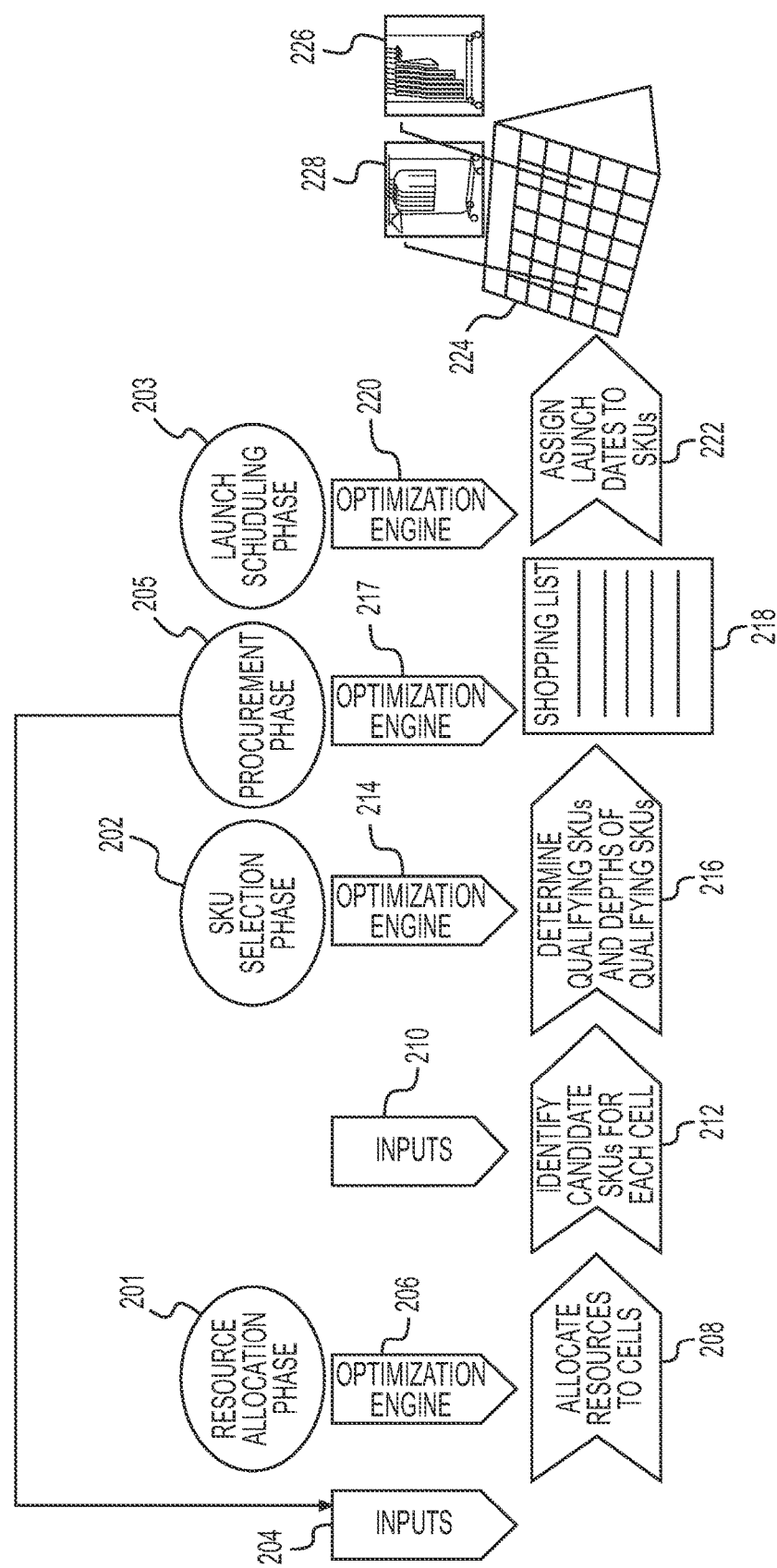
FIG. 2 depicts a schematic diagram showing an exemplary process for merchandise assortment optimization at one or more inventories of a clothing-as-a-service electronic platform, according to one or more embodiments.

FIG. 2 depicts a schematic diagram showing an exemplary process 200 for optimizing merchandise assortment at one or more inventories of a CaaS electronic platform, according to one or more embodiments. Although FIG. 2 shows example steps of an exemplary method 200, in some implementations, the exemplary method 200 may include additional steps, fewer steps, different steps, or differently arranged steps than those depicted in FIG. 2. Additionally, or alternatively, two or more of the steps of the exemplary method 200 may be performed in parallel.

As the server system 102 prepares assortment of merchandise associated with the CaaS service(s) (e.g., retail, rental, or subscription-based distribution services) for each upcoming period (e.g., a 3-month season, a quarter, a year, or any predetermined period of time), the server system 102 may iterate through the phases of the exemplary process 200 as depicted in FIG. 2.

The server system 102 may begin by receiving inputs 204 and storing the received inputs 204 into one or more electronic databases in the exemplary environment 100 such as databases 106. The inputs 204 may be received from, from example, one or more employee devices 116, external systems 112, and/or any other computing device(s) or database(s) in communication with the server system 102.

The inputs 204 may include data describing a plurality of cells (e.g., one or more values corresponding to each cell). The plurality of cells may be at a predetermined level of granularity that may result from, for example, the number of dimensions that define the cells. For example, data including two-dimensional cells may be considered to have a lower level of granularity than data having three-dimensional cells. A dimension of the cells may be category, vendor, pattern (e.g., solid vs. print), end-use (e.g., work vs. casual), size, month(s) for stocking, persona, silhouette (e.g., fit and flare), or any other attribute that may describe a wearable item. As such, a dimension may each be defined using an item attribute (e.g., "category"), and may have a decision variable (e.g., one for each of 7 different categories) associated therewith. For example, if the plurality of cells in the inputs 204 are three-dimensional cells with the three dimensions being 7 categories, 3 end-uses, and 2 patterns, the inputs 204 may include 42 cells (e.g., 7×3×2). Accordingly, based on the inputs 204 providing the number of attributes that form the dimensions of merchandise to be stocked, as well as the number of decision variables available for each attribute, the server system 102 may determine the number of cells $N_{cells}$ to allocate resources to, by:

$$N_{cells} = N_{A1} \times N_{A2} \times \ldots \times N_{Ax},$$

where $N_{Ax}$ = number of decision variables available for the xth attribute Ax.

As described in more detail below, the server system 102 may determine merchandise assortment data, such as resource allocations and stock keeping unit allocations, for each of the cells among $N_{cells}$.

The inputs 204 may additionally include other parameters such as, for example, a total number of resources for allocation to the plurality of cells, a permitted deviation range for the total number of resources to be allocated, expected revenue per article for each cell, expected cost per article for each cell, demand forecast values for each cell (e.g., expected number of closetings per style in each cell), overall style count target (e.g., total number of styles to be launched during the upcoming season), uni-dimensional style count targets, overall article identifier count target for the season, cell-specific bounds on article identifier count per style, and cell-specific bounds on article identifier counts. The values for these parameters may be received and stored in one or more databases (e.g., databases 106 in the exemplary environment 100), and may be used at one or more steps of the exemplary process 200, in association with the plurality of cells. For example, at least some of these values may be used by optimization engine 206 as parameters in step 208, as described in more detail below.

After receiving the inputs 204, the server system 102 may iterate through the phases of the exemplary process 200 for optimizing merchandise assortment for an upcoming period. The exemplary process 200 may be performed in at least three phases: resource allocation phase 201, SKU (stock keeping unit) selection phase 202, procurement phase 205, and launch scheduling phase 203.

The resource allocation phase 201 may include a step of allocating resources (e.g., a value among the inputs 204, such as the total budget or the total article identifier count) to the plurality of cells (Step 208), using an optimization engine 206. The optimization engine 206 may be, for example, a set of computer-readable instructions that configure the server system 102 to perform the functions of step 208. Additionally, or alternatively, the optimization engine 206 may be an executable microservice being executed in the server system 102 to perform the functions of step 208, and/or an executable service component in external systems 122 that configures one or more processors in the environment 100 to perform the functions of step 208. The step 208 may include two sub-steps sequentially performed by the optimization engine 206, and the two sub-steps may include a style allocation sub-step and an article identifier count allocation sub-step.

The style allocation sub-step may be configured to allocate the number of styles among the cells, in such a way that the expected overall number of closetings are maximized. For example, if the optimization engine 206 receives the overall style count target (e.g., 500 styles during Spring 2019), three dimensions (e.g., category c, end-use u, and pattern p), uni-dimensional style count targets for each of these dimensions (e.g., 300 styles of dresses, 250 styles of work wear, or 325 printed styles), and the expected number of closetings per style in each cell, the optimization engine 206 may allocate the number of styles to each cell by running the following exemplary model at the server system 102 and determining $s_{cup}$ for each cell using the exemplary model:

$$\max_{s_{cup}} \sum_{c,u,p} r_{cup} s_{cup}$$

$$\text{s.t.} \sum_{c,u,p} s_{cup} = S$$

$$\sum_{u,p} s_{cup} = S_c \forall c \text{(style count targets by category)}$$

$$\sum_{c,p} s_{cup} = S_u \forall u \text{(style count targets by enduse)}$$

$$\sum_{c,u} s_{cu} = S_p \forall p \text{(style count targets by pattern)}$$

$$s_{cup} \in \mathbb{Z}^* \forall c, u, p$$

Where,
$s_{cup}$=number of styles to be launched for category c, end-use u, and pattern p
S=overall style count target
$S_c$=uni-dimensional style count target for category c
$S_u$=uni-dimensional style count target for end-use u
$S_p$=uni-dimensional style count target for pattern p
$r_{cup}$=expected number of closetings per style in a cell for category c, end-use u, and pattern p. This model relies on a presumption that number of closetings are indicative of, and proportional to, demands of the users.

As shown in the exemplary model described above with respect to the style allocation sub-step, the optimization engine 206 may likely assign more $s_{cup}$ to cells having higher closeting rates (e.g., $r_{cup}$). On the other hand, the optimization engine 206 may likely allocate fewer styles to cells with lower closeting rates, in order to ensure that the expected overall number of closetings are maximized.

Additionally, the optimization engine 206 may also be configured to impose cell-based constraints on the exemplary model, in order to account for other important factors in addition to maximizing the expected overall number of closetings. For example, cells having no depth (e.g., 0 style count allocated thereto) may cause other types of customer dissatisfaction(s) that reduce users' demands or loyalty in the long run. Thus, the optimization engine 206 may be configured to impose lower and/or upper bounds on cell-specific style counts (e.g., each $s_{cup}$). With such constraints added to the model, the adjusted model may ensure that cells with lower closeting rates get minimum style counts, and/or cells with higher closeting rates get maximum style counts.

The optimization engine 206 may impose additional or alternative constraints. For example, the optimization engine 206 may impose a bi-dimensional style count targets. A bi-dimensional style count target may be, for example, requiring at least 100 styles of work dresses. Such a constraint on "work dresses" would be applied to cells corresponding to both the "end-use" dimension of "work" and the "category" dimension of "dresses." Furthermore, under the style allocation exemplary model described above, such a bi-dimensional constraint would not apply any condition to the dimension of "pattern," and hence, work dresses of all patterns may be affected by this constraint.

After the style allocation sub-step, the optimization engine 206 may perform the article identifier count allocation sub-step. Based on inputs 204 and/or retrieval of existing data from one or more databases (e.g., databases 106) in communication with the server system 102, the optimization engine 206 may obtain parameters such as, for example, overall resources (e.g., budget) for the upcoming period, overall article identifier count target for the upcoming period, style counts by cell (e.g., output $s_{cup}$ of each cell from the style allocation sub-step), average unit cost per article identifier by cell (e.g., average unit cost which, when multiplied by article identifier count for the cell, would equal the budget for the cell), cell-specific bounds on article identifier count per style, and cell-specific bounds on article identifier counts. The cell-specific bounds on article identifier count per style may be, for example, the range of "25-100" being the average article identifier count per style in the cell for "printed work dresses." The cell-specific bounds on article identifier counts may be, for example, the range of "1000-1200" being the number of article identifiers permitted for the cell for "printed work dresses."

In some implementations, the article identifier count allocation sub-step may allocate the overall article identifier count among the cells, in such a way that an overall wearability is maximized while meeting the article identifier count targets (e.g., overall article identifier count target for the upcoming period, cell-specific bounds on article identifier count per style, and cell-specific bounds on article identifier counts). For these implementations, the optimization engine 206 may first receive the average wearability metric for each cell of the plurality of cells, from designated sources such as, for example, inputs 204 and/or existing data from databases 106. Various embodiments of determining wearability metrics of wearable items are disclosed, for example, in U.S. patent application Ser. No. 16/275,989, filed Feb. 14, 2019, entitled "Systems and Methods for Automatic Apparel Wearability Model Training and Prediction," which is incorporated herein by reference in its entirety. Provided that each cell has corresponding data including one or more average wearability metrics (e.g., average wearability metric per cell or average wearability metric per style), the article identifier count targets, and the style count, the optimization engine 206 may then allocate an article identifier count to each cell by selecting the allocation that outputs the maximum overall wearability metric (e.g., a weighted sum of all average wearability metrics with weights being the article identifier count in each cell). Under such a model, the optimization engine 206 may likely allocate more article identifier count to cells with historically higher average wearability. Thus, such an allocation may increase the wearability of the overall assortment of merchandise.

The prediction data processing module may collect and prepare data in order for the predictive metrics generating module to generate predictive wearability metrics. The prediction data processing module may collect data as close to real-time as possible. For example, if a user just closeted a new garment and/or return notified (e.g., sent an RN for) a garment, the prediction data processing module may capture data attributes associated with all of those activities immediately, because obtaining or missing one data attribute for a user may have an effect on the predictive wearability metrics produced by the predictive metrics generating module. The active closet data may be received from BI component. Active data related to RNs may be received from, for example, the modeling data processing module. Additionally, the prediction data processing module may not only capture new closeting or RN data relationships (e.g., UUID-SKU relationship), but also collect data attributes related to the relationship (e.g., details regarding each SKU on attribute levels), from the BI component, the modeling data processing module, or any other databases in in communication with the environment.

Using the collected data, the prediction data processing module may prepare the prediction data for subsequent steps (e.g., steps performed by the predictive metrics generating module). First, the prediction data processing module may define the universe of the closeted pairs of unique user identifiers and unique apparel identifiers. Then it may join advanced features (e.g., advanced analytics tables described with respect to processing modeling data) for the closeted pairs. The closeted files may then be downloaded into one or more csv files. With the data set from the one or more csv files, the prediction data processing module may then clean the data set, based on further conditions. For example, prediction data processing module may detect a preset condition that data associated with historical feedback from users may be used only if the data has an RN count (e.g., number of RNs received regarding that apparel or that user) over 5, or any other preset threshold value. In this example, any data with less than or equal to the preset threshold value may be voided from the data set as part of the cleaning process.

After cleaning the data, the prediction data processing module may then transform the data set by running the data set into additional filters and conversions. For example, model ETL objects (saved by the modeling data processing module) may be loaded. In addition, categorical features may be dummified. For example, attributes pertaining to a category of apparel or users, rather than to an individual garment or user, may have arbitrary, inaccurate, or unfilled values when compared to attributes pertaining to (UUID, SKU) pairs, and such values may be replaced with dummy values. Additionally, missing features may be imputed by, for example, searching for the missing feature value from other places (e.g., BI component, product OLTP component, or any other database or internal storage accessible by wearability setup subsystem), and/or filling the missing features with default, preset value. Additionally, the features may also be normalized, by realigning or adjusting values based on a preset factor, removing outliers, and/or standardizing the values in any way in accordance with preset rules or conditions. As a result of these transformations, the prediction data may be prepared and become available for the module for the predictive metrics generating module.

The predictive metrics generating module may then run prediction on the prediction data, by predicting one or more predictive wearability metrics indicative of propensity to wear. Such a prediction may occur by loading the stored one or more trained model objects, executing the trained model objects with the prediction data, and generating predictive wearability metrics resulting from the execution of the training model objects. In some implementations, the predictive metrics generating module may also predict metrics or scores for training pairs (e.g., for purposes of assessment or training associated with the prediction process). The predictive metrics generating module may then store the resulting predictive wearability metrics in metrics database.

In some implementations, the article identifier count allocation sub-step may allocate the overall article identifier count among the cells, in such a way that the optimization engine 206 maximizes the portion of resources (e.g., budget) spent in certain specified cells. For these implementations, the optimization engine 206 may first receive one or more additional inputs and/or data (e.g., inputs in addition to the inputs 204) that specify the cell(s) intended to have maximum portion of the resources (e.g., budget). Using the one or more additional inputs and/or data, the optimization engine 206 may then allocate an article identifier count to each cell by selecting the allocation that maximizes the portion of resources (e.g., budget) spent in the designated cell(s).

In some implementations, the article identifier count allocation sub-step may allocate an overall resources (e.g., budget) for the upcoming period to the cells, in such a way that the optimization engine 206 maximizes the overall article identifier count. For these implementations, the optimization engine 206 may use the input parameter value under the variable "overall article identifier count target for the upcoming period" as the lower bound for the overall article identifier count. A rationale for implementing such a model is demands for CaaS services (e.g., closetings of the users at the platform) may increase with more supply available (e.g., overall article identifier count). Accordingly, for this model, maximizing the article identifier count may be considered to be a trigger for maximizing closetings of users. Because this model allocates a fixed amount of resources (e.g., budget) while maximizing the quantity of goods to be purchased under the fixed budget, it may likely allocate larger quantity of resources to styles in cells with lower average unit cost.

In some implementations, the article identifier count allocation sub-step may allocate the overall budget for the upcoming period among the cells, in such a way that an overall wearability is maximized while staying within the overall budget. For these implementations, the optimization engine 206 may first receive the average wearability metrics for each cell from designated sources such as, for example, inputs 204 and/or existing data from databases 106. Various embodiments of determining wearability metrics of wearable items are disclosed, for example, in U.S. patent application Ser. No. 16/275,989, filed Feb. 14, 2019, entitled "Systems and Methods for Automatic Apparel Wearability Model Training and Prediction," which is incorporated herein by reference in its entirety. Provided that each cell has corresponding data including one or more average wearability metrics (e.g., average wearability metrics per cell or average wearability metric per style), the optimization engine 206 may then allocate the overall budget to the cells by selecting the budget allocation that outputs the maximum overall wearability metric (e.g., weighted sum of all wearability metrics, with weights being the article identifier count in each cell). Under such a model, the optimization engine 206 may likely allocate more article identifier count to cells with historically higher average wearability. Thus, such an allocation may increase the wearability of the overall assortment of merchandise.

At the SKU selection phase 202, candidate SKUs for each cell may be identified. At this point, the server system 102 may already have access to data including, for example, the allocated budget, the allocated article identifier count, style count, and all input parameters (e.g., inputs 204) corresponding to each cell, from the resource allocation phase 201. In addition to these existing data, further inputs 210 may be received at the server system 102 (e.g., at a user interface) in step 212, in order to identify candidate SKUs for each cell. Candidates SKUs may be one or more supersets of the qualifying SKUs which may be selected in a later step 216. In some implementations, the inputs 210 may directly identify some or all of the candidate SKUs. Additionally, or alternatively, the inputs 210 may provide sufficient data that allow the server system 102 to retrieve, look up, identify the candidate SKUs. For example, the inputs 210 may provide one or more links to data repositories having one or more candidate SKUs.

Based on the data collected at the resource allocation phase 201 and step 212 of SKU selection phase 202, an optimization engine 214 may perform the step of determining the qualifying SKUs and depths of qualifying SKUs (step 216), in order to balance the breadth of the SKUs versus the depth of the SKUs in each cell. Naturally, with everything else being constant, users of the CaaS services may like to see as many styles and SKUs as possible under each type of wearable item. However, given the budget constraint, the variety of SKUs available within a cell may be inversely proportional to the average depth (e.g., quantity) of SKUs in that cell. For example, if more SKUs are bought in a cell, the CaaS services may only be able to afford to buy lower average quantity (e.g., lower average article identifier count) for the SKUs. Further, as the variety of SKUs increases, the total number of article identifier count across all SKUs may decline, because of the fact that SKUs are not priced uniformly. Accordingly, as variety of SKUs increase, the average depth of each SKU, as well as overall available quantity of articles, may decline.

Therefore, for an optimal selection of the qualifying SKUs and the depths of the qualifying SKUs to be made at step 216, the optimization engine 214 may first determine, for any group of SKUs (e.g., each cell, style, or any permissible grouping of SKUs), a choice between (i) a bigger selection of SKUs with a smaller probability of a consumer receiving a given SKU, and (ii) a smaller selection of SKUs with a higher probability of receiving. Additionally, the optimization engine 214 may determine the qualifying SKUs among the candidate SKUs, as well as the quantity corresponding to each of the qualifying SKUs. These determinations may be made, for example, receiving inputs and/or selections by employee(s) 114 at a user interface loaded at the one or more employee devices 116. For example, the optimization engine 214 may be one or more user interfaces loaded at the one or more employee devices 116, where the employee(s) 114 may review the candidate SKUs, determine a balance between breadth and depth of the SKUs, and select and/or enter the qualifying SKUs.

Additionally, or alternatively, the optimization engine 214 may determine the qualifying SKUs and the depths of the qualifying SKUs by configuring the server system 102 to optimize these determinations based on a computer-implemented algorithm. Table 1 shows four different sets of criteria, by which such an optimization model may be implemented:

TABLE 1

|  | Expected Revenue | Asset Count |
| --- | --- | --- |
| Breadth (Variety) | (1) Set threshold (minimum) value of breadth and find the maximum expected revenue. | (2) Set threshold (minimum) value of breadth and find the maximum asset count (article identifier count). |
| Depth | (3) Set threshold (minimum) value of depth and find the maximum expected revenue. | (4) Set threshold (minimum) value of depth and find the maximum asset count (article identifier count). |

In some implementations, the optimization engine 214 may be configured to optimize based on option (2) of table 1 shown above. Setting a threshold minimum value for breadth and maximizing the asset count may be a viable option for various reasons. For example, it may be costly for the optimization engine 214 to estimate revenue potentials (e.g., average unit revenue) for candidate SKUs, and under this option, the optimization engine may be able to assume that they all have same revenue potentials without having a significant effect on the results. Further, at the SKU selection phase 202, the server system 102 may be likely to have maximized expected revenues at a previous phase (e.g., resource allocation phase 201), while also having sufficient data indicative of acceptable range of breadth value(s). In addition, a user satisfaction based on breadth of SKUs may be a step function. While the users may be dissatisfied at low breadth of SKUs, the user satisfaction may be relatively stagnant above a certain threshold of SKU breadth.

Therefore, under these implementations employing option (b), the optimization engine 214 may analyze the trade-off between an asset count versus a breadth threshold value, and determine the most optimal breadth threshold value based on analyzing how much asset count needs to be sacrificed to have a higher breadth threshold. Optionally, further bounds may be imposed to this optimization model, such as bounds on average depth of SKUs (e.g., imposing a rule to never purchase anything at less than 2 ore more than 20), bounds on average unit cost, bounds on vendor volumes, etc. Thus, under this implementation, the optimization engine 214 may determine the qualifying SKUs and depths of qualifying SKUs using the following model.

$d_{ij}$ = Depth of candidate $SKU$ $i$ on the menu for cell $j$ $$y_{ij} = \begin{cases} 1 & \text{if } d_{ij} > 0 \\ 0 & \text{else} \end{cases}$$

$c_{ij}$ = Unit cost of candiate $SKU$ $i$ on the menu of cell $j$ $B_j$ = Resource(e.g., Budget)allocated for cell $j$ $V_j$ = Minimum variety(breadth count or $SKU$ count)required for cell $j$ $$\max_{d_{ij}} \sum_{i,j} d_{ij}$$

s.t. $d_{ij} \geq y_{ij} \forall\, i, j$

-continued $$\sum_i c_{ij} d_{ij} \leq B_j \forall\, j \qquad \text{(Budget Constraints)}$$

$$\sum_i y_{ij} \geq V_j \forall\, j \qquad \text{(Breadth Requirement)}$$

$$d_{ij} \in \mathbb{Z}^* \forall\, i,j \qquad \text{(All depths are non-negative integers)}$$

$$y_{ij} \in \{0, 1\} \forall\, i,j \qquad \text{(All } y_{ij} \text{ are binary integers)}$$

After completing the SKU selection phase 202, the server system 102 may then proceed to the procurement phase 205. In the procurement phase 205, the identification and the corresponding depth of each qualifying SKUs may be transformed into a shopping list 218. In some implementations, the shopping list 218 may include a data file received and stored at the server system 102, with its formats modified from one or more formats of the output of step 216. Additionally, or alternatively, the shopping list 218 may include a direct output (e.g., one or more print-outs, data displayed at employee device(s) 116, and/or transmission over network 101) of data resulting from step 216.

With the shopping list 218, an optimization engine 217 at the server system 102 may communicate with one or more vendor systems (e.g., tenant devices 120 or external systems 122) associated with the SKUs output from step 216, using, for example, an API access, a web browser access, an electronic messaging system, a back-end portal access between communication endpoints, or any other suitable communication mechanisms on the one or more networks 101. The communication with the one or more vendor systems may be performed in order to transmit, for example, one or more procurement requests to the pertinent vendors of the SKUs (e.g., qualifying SKUs at depths specified by the output of step 216) using the SKU data included in the shopping list. Additionally, the optimization engine 217 may generate, manage, monitor, and/or track these communications with the vendors, using criteria set forth by, for example, user inputs, one or more pre-configured priority settings, or one or more pre-configured dynamic prioritization algorithms, at the server system 102. Furthermore, at the procurement phase 205, the server system 102 may return to the state of receiving inputs 204 as shown in FIG. 2 and re-traverse through phases 201 and 202 as an iterative process, if the server system 102 determines (e.g., via a detection or an input) that additional or progressive optimizations for resource allocation or SKU selection may be needed.

Lastly, the server system 102 may enter the launch scheduling phase 203. Based on the shopping list 218, an optimization engine 220 may perform the step of assigning launch dates (step 222), in order to meet visual merchandise requirements and assign SKUs to suitable launch windows (e.g., pre-determined 2-week launch windows). For example, the launch date assignments 224 linked with particular dates may ensure that different SKUs (e.g., SKUs 226 and 228) launch in time for any required visual merchandise requirements for the upcoming period. The assignment of launch dates by optimization engine 220 may be performed, for example, by receiving inputs at the server system 102 (e.g., at a user interface), via employee devices 116 or external systems 122. Additionally, or alternatively, the assignment of launch dates by optimization engine 220 may be performed, for example, by looking up or querying existing data (e.g., launch windows for a previous season), receiving or retrieving any adjustments to the existing data, and outputting the adjusted data in a launch schedule format for the upcoming period. Based on the launch date assignments 224, the one or more inventories of the CaaS services for the upcoming season may be stocked with one or more articles corresponding to the stock keeping units in each cell, in accordance with the SKUs and quantities determined from the SKU selection phase 202.

Figure 3:
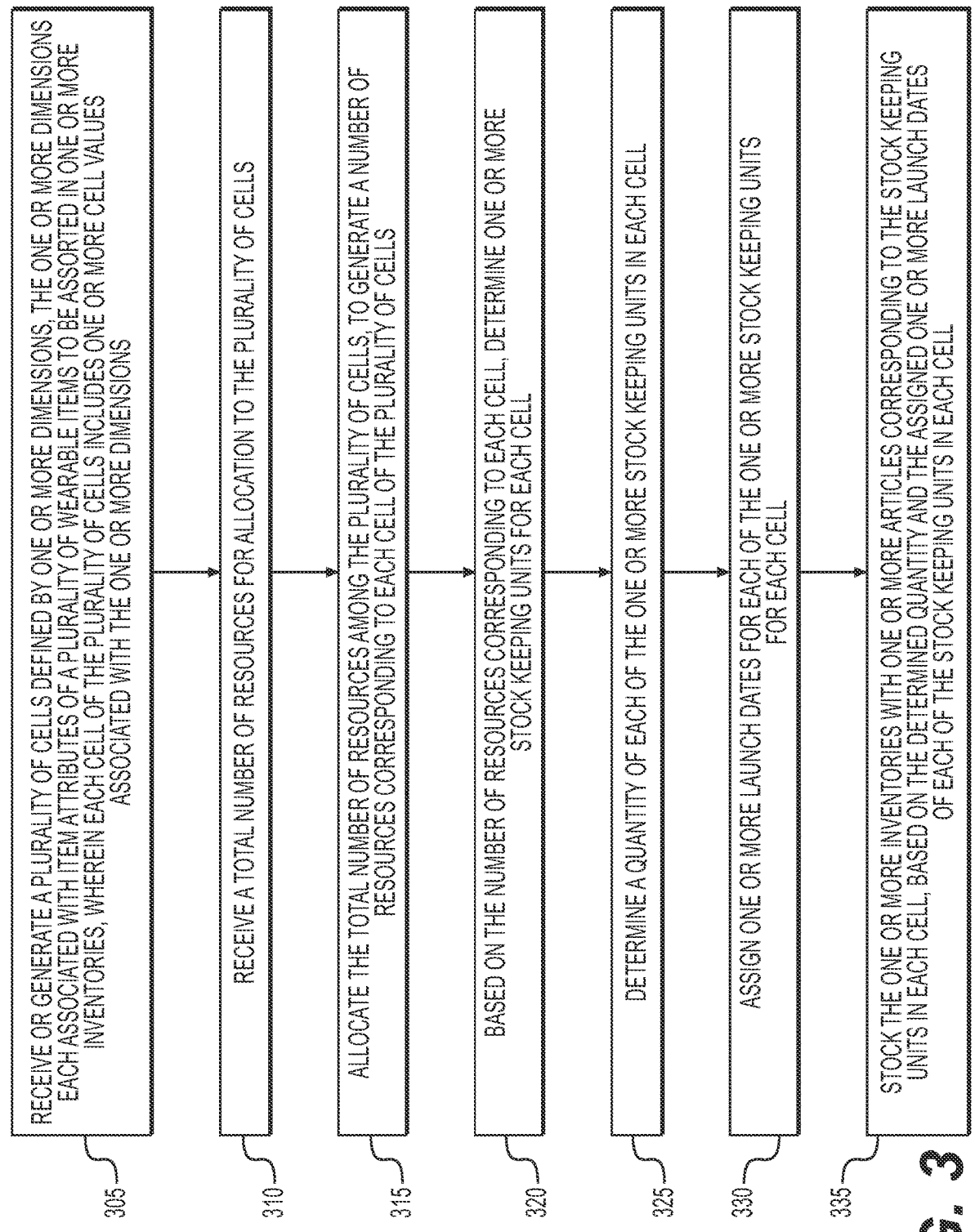
FIG. 3 depicts an exemplary method for dynamically assorting merchandise, according to one or more embodiments.

FIG. 3 depicts an exemplary method 300 for dynamically assorting merchandise, according to one or more embodiments. First, one or more processors (e.g. one or more processors of the server system 102, the employee devices 116, the tenant devices 120, and/or the external systems 122) may receive or generate a plurality of cells defined by one or more dimensions, the one or more dimensions each associated with item attributes of a plurality of wearable items to be assorted in one or more inventories, wherein each cell of the plurality of cells includes one or more cell values associated with the one or more dimensions (Step 305). Then, the one or more processors may receive a total number of resources for allocation to the plurality of cells (Step 310). The one or more processors may allocate the total number of resources among the plurality of cells (e.g., using the exemplary processes described above with respect to resource allocation phase 201 of FIG. 2), to generate a number of resources corresponding to each cell of the plurality of cells (Step 315). Based on the number of resources corresponding to each cell, The one or more processors may determine one or more stock keeping units for each cell (Step 320). The one or more processors may then determine a quantity of each of the one or more stock keeping units in each cell (Step 325). The one or more processors may assign one or more launch dates for each of the one or more stock keeping units for each cell (Step 330). Then, one or more processors may be used to stock the one or more inventories with one or more articles corresponding to the stock keeping units in each cell, based on the determined quantity and the assigned one or more launch dates of each of the stock keeping units in each cell (Step 335).

Although FIG. 3 shows example blocks of an exemplary method 300, in some implementations, the exemplary method 300 may include additional blocks, fewer blocks, different blocks, or differently arranged blocks than those depicted in FIG. 3. Additionally, or alternatively, two or more of the blocks of the exemplary method 300 may be performed in parallel.

Figure 4:
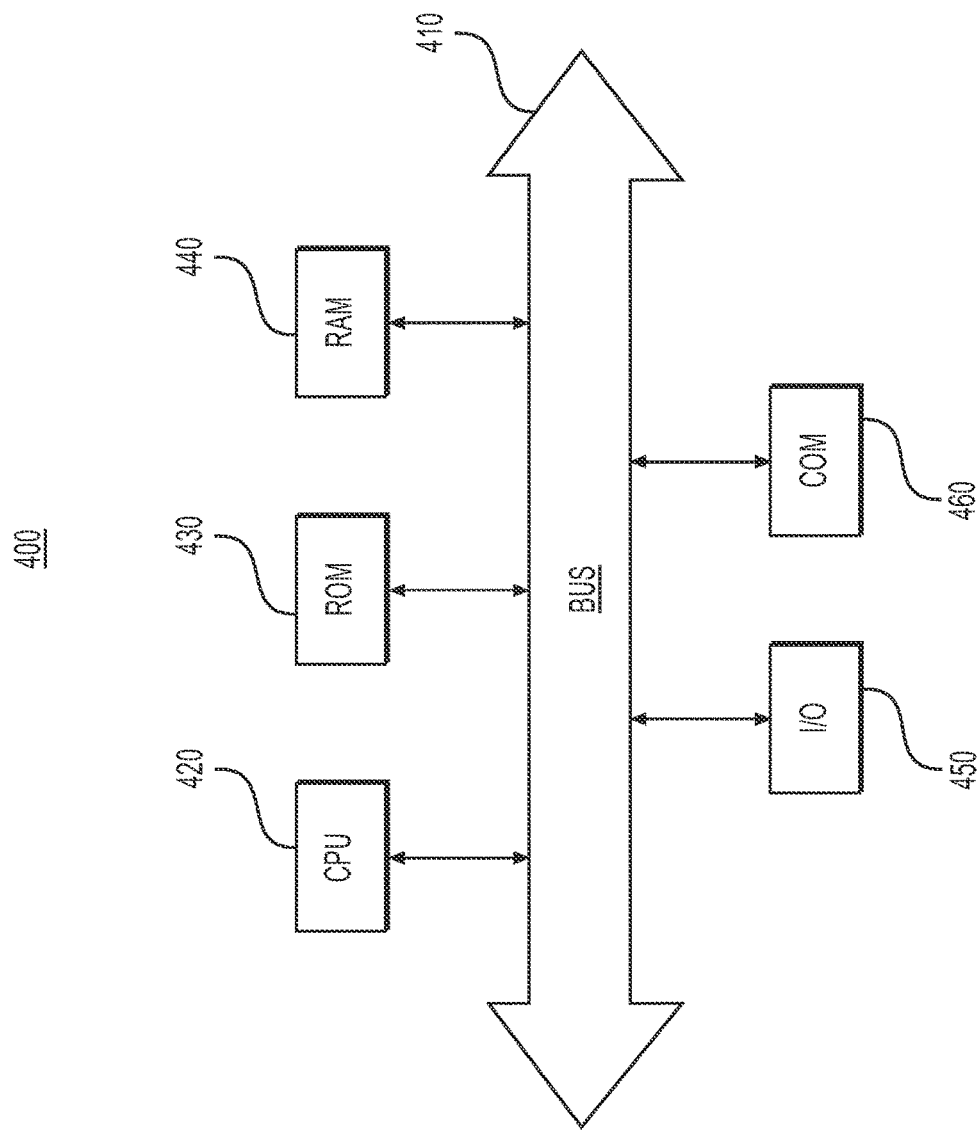
FIG. 4 depicts an exemplary computer device or system, in which embodiments of the present disclosure, or portions thereof, may be implemented.

FIG. 4 depicts an exemplary computer device or system, in which embodiments of the present disclosure, or portions thereof, may be implemented. In some implementations, the server system 102, the user devices 112, the employee devices 116, the tenant devices 120, the employee devices 202, the user devices 204, the internal system 206, the external systems 212, the server system 300, and/or any other computer system or user terminal for performing the various embodiments of the present disclosure, may correspond to device 400. Additionally, each of the exemplary computer servers, databases, user interfaces, modules, and methods described above with respect to FIGS. 1-3 can be implemented in device 400 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-3, may be implemented using a processor device 400. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 4, a device 400 used for performing the various embodiments of the present disclosure (e.g., the server system 102, the user devices 112, the employee devices 116, the tenant devices 120, the employee devices 202, the user devices 204, the internal system 206, the external systems 212, the server system 300, and/or any other computer system or user terminal for performing the various embodiments of the present disclosure) may include a central processing unit (CPU) 420. CPU 420 may be any type of processor device including, for example, any type of special purpose or a general-purpose microprocessor device. As will be appreciated by persons skilled in the relevant art, CPU 420 also may be a single processor in a multi-core/multiprocessor system, such system operating alone, or in a cluster of computing devices operating in a cluster or server farm. CPU 420 may be connected to a data communication infrastructure 410, for example, a bus, message queue, network, or multi-core message-passing scheme.

A device 400 (e.g., the server system 102, the user devices 112, the employee devices 116, the tenant devices 120, the employee devices 202, the user devices 204, the internal system 206, the external systems 212, the server system 300, and/or any other computer system or user terminal for performing the various embodiments of the present disclosure) may also include a main memory 440, for example, random access memory (RAM), and may also include a secondary memory 430. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 430 may include other similar means for allowing computer programs or other instructions to be loaded into device 400. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 400.

A device 400 may also include a communications interface ("COM") 460. Communications interface 460 allows software and data to be transferred between device 400 and external devices. Communications interface 460 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 460. These signals may be provided to communications interface 460 via a communications path of device 400, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. A device 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for dynamically optimizing merchandise, the method comprising:
   receiving, by a server system, an input from a device, the input including a plurality of resources and one or more dimensions, wherein the one or more dimensions are each associated with one or more item attributes;
   based on the input, determining, by an optimization engine, a plurality of cells;
   allocating, by the optimization engine, the plurality of resources among the plurality of cells;
   receiving, by the server system, an average wearability metric for each cell of the plurality of cells and an overall article identifier count for the plurality of cells, wherein the average wearability metric is indicative of an average level of propensity that one or more wearable items of the cell of the plurality of cells will be actually worn by one or more users, wherein the average wearability metric corresponds to wearability metrics determined by executing one or more trained model objects with prediction data, the prediction data including a plurality of data relationships and a plurality of data attributes corresponding to the plurality of data relationships, the plurality of data relationships being between a plurality of unique user identifiers and a plurality of unique apparel identifiers, the plurality of data attributes corresponding to one or more historical transactions;
   allocating, by the optimization engine, the overall article identifier count among the plurality of cells such that an overall wearability metric of the plurality of cells is maximized, wherein maximizing the overall wearability metric includes allocating a higher article identifier count to at least one cell of the plurality of cells with a historically higher wearability average, wherein the overall wearability metric of the plurality of cells is a weighted sum of the average wearability metric of every cell, with each weight of the weighted sum derived based on the article identifier count of each cell of the plurality of cells;
   determining, by the optimization engine, merchandise assortment data for each cell of the plurality of cells, wherein the merchandise assortment data includes at least one resource and at least one qualifying SKU (stock keeping unit) and a corresponding qualifying SKU quantity;
   transforming, by the optimization engine, the at least one qualifying SKU and the corresponding qualifying SKU quantity into a list;
   based on the list, assigning, by the optimization engine, one or more launch dates for each of the at least one qualifying SKU for each cell of the plurality of cells; and
   based on the one or more launch dates, stocking, by the server system, at least one inventory with one or more articles corresponding to the at least one qualifying SKU and the corresponding qualifying SKU quantity for each cell of the plurality of cells.

2. The method of claim 1, wherein the allocating the plurality of resources among the plurality of cells further comprises:
   receiving, by the server system, a style count target for each of the one or more dimensions, an overall style count target for the plurality of cells, and an expected number of closetings per style for each cell of the plurality of cells; and
   allocating, by the optimization engine, the overall style count target among the plurality of cells to generate a style count for each cell of the plurality of cells, based on the style count target for each of the one or more dimensions and the expected number of closetings per style for each cell of the plurality of cells.

3. The method of claim 2, wherein the allocating the overall style count target among the plurality of cells further comprises:
   imposing, by the optimization engine, a lower bound to the style count for each cell of the plurality of cells.

4. The method of claim 2, wherein the allocating the overall style count target among the plurality of cells further comprises:
   imposing, by the optimization engine, an upper bound to the style count for each cell of the plurality of cells.

5. The method of claim 1, wherein the determining the merchandise assortment data for each cell of the plurality of cells further comprises:
   identifying, by the server system, at least one candidate SKU for each cell of the plurality of cells; and
   determining, by the optimization engine, an optimal selection of the at least one candidate SKU, the optimal selection including the at least one qualifying SKU and the corresponding qualifying SKU quantity.

6. A computer system for dynamically optimizing merchandise, the computer system comprising:
   a memory having processor-readable instructions stored therein; and
   at least one processor configured to access the memory and execute the processor-readable instructions, which when executed by the at least one processor configures the at least one processor to perform a plurality of functions, including functions for:
      receiving an input from a device, the input including a plurality of resources and one or more dimensions, wherein the one or more dimensions are each associated with one or more item attributes;
      based on the input, determining a plurality of cells;
      allocating the plurality of resources among the plurality of cells;
      receiving an average wearability metric for each cell of the plurality of cells and an overall article identifier count for the plurality of cells, wherein the average wearability metric is indicative of an average level of propensity that one or more wearable items of the cell of the plurality of cells will be actually worn by one or more users, wherein the average wearability metric corresponds to wearability metrics determined by executing one or more trained model objects with prediction data, the prediction data including a plurality of data relationships and a plurality of data attributes corresponding to the plurality of data relationships, the plurality of data relationships being between a plurality of unique user identifiers and a plurality of unique apparel identifiers, the plurality of data attributes corresponding to one or more historical transactions;

allocating the overall article identifier count among the plurality of cells such that an overall wearability metric of the plurality of cells is maximized, wherein maximizing the overall wearability metric includes allocating a higher article identifier count to at least one cell of the plurality of cells with a historically higher wearability average, wherein the overall wearability metric of the plurality of cells is a weighted sum of the average wearability metric of every cell, with each weight of the weighted sum derived based on the article identifier count of each cell of the plurality of cells;

determining merchandise assortment data for each cell of the plurality of cells, wherein the merchandise assortment data includes at least one resource and at least one qualifying SKU (stock keeping unit) and a corresponding qualifying SKU quantity;

transforming the at least one qualifying SKU and the corresponding qualifying SKU quantity into a list;

based on the list, assigning one or more launch dates for each of the at least one qualifying SKU for each cell of the plurality of cells; and based on the one or more launch dates, stocking at least one inventory with one or more articles corresponding to the at least one qualifying SKU and the corresponding qualifying SKU quantity for each cell of the plurality of cells.

7. The computer system of claim 6, wherein the allocating the plurality of resources among the plurality of cells further comprises:

receiving a style count target for each of the one or more dimensions, an overall style count target for the plurality of cells, and an expected number of closetings per style for each cell of the plurality of cells; and allocating the overall style count target among the plurality of cells to generate a style count for each cell of the plurality of cells, based on the style count target for each of the one or more dimensions and the expected number of closetings per style for each cell of the plurality of cells.

8. The computer system of claim 7, wherein the allocating the overall style count target among the plurality of cells further comprises:

imposing a lower bound to the style count for each cell of the plurality of cells.

9. The computer system of claim 7, wherein the allocating the overall style count target among the plurality of cells further comprises:

imposing an upper bound to the style count for each cell of the plurality of cells.

10. The computer system of claim 6, wherein the determining the merchandise assortment data for each cell of the plurality of cells further comprises:

identifying at least one candidate SKU for each cell of the plurality of cells; and determining an optimal selection of the at least one candidate SKU, the optimal selection including the at least one qualifying SKU and the corresponding qualifying SKU quantity.

11. A non-transitory computer-readable medium containing instructions for dynamically optimizing merchandise, comprising:

receiving an input from a device, the input including a plurality of resources and one or more dimensions, wherein the one or more dimensions are each associated with one or more item attributes;

based on the input, determining a plurality of cells;

allocating the plurality of resources among the plurality of cells;

receiving an average wearability metric for each cell of the plurality of cells and an overall article identifier count for the plurality of cells, wherein the average wearability metric is indicative of an average level of propensity that one or more wearable items of the cell of the plurality of cells will be actually worn by one or more users, wherein the average wearability metric corresponds to wearability metrics determined by executing one or more trained model objects with prediction data, the prediction data including a plurality of data relationships and a plurality of data attributes corresponding to the plurality of data relationships, the plurality of data relationships being between a plurality of unique user identifiers and a plurality of unique apparel identifiers, the plurality of data attributes corresponding to one or more historical transactions;

allocating the overall article identifier count among the plurality of cells such that an overall wearability metric of the plurality of cells is maximized, wherein maximizing the overall wearability metric includes allocating a higher article identifier count to at least one cell of the plurality of cells with a historically higher wearability average, wherein the overall wearability metric of the plurality of cells is a weighted sum of the average wearability metric of every cell, with each weight of the weighted sum derived based on the article identifier count of each cell of the plurality of cells;

determining merchandise assortment data for each cell of the plurality of cell, wherein the merchandise assortment data includes at least one resource and at least one qualifying SKU (stock keeping unit) and a corresponding qualifying SKU quantity;

transforming the at least one qualifying SKU and the corresponding qualifying SKU quantity into a list;

based on the list, assigning one or more launch dates for each of the at least one qualifying SKU for each cell of the plurality of cells; and based on the one or more launch dates, stocking at least one inventory with one or more articles corresponding to the at least one qualifying SKU and the corresponding qualifying SKU quantity for each cell of the plurality of cells.

12. The non-transitory computer-readable medium of claim 11, wherein the allocating the plurality of resources among the plurality of cells further comprises:

receiving a style count target for each of the one or more dimensions, an overall style count target for the plurality of cells, and an expected number of closetings per style for each cell of the plurality of cells; and allocating the overall style count target among the plurality of cells to generate a style count for each cell of the plurality of cells, based on the style count target for each of the one or more dimensions and the expected number of closetings per style for each cell of the plurality of cells.

13. The non-transitory computer-readable medium of claim 12, wherein the allocating the overall style count target among the plurality of cells further comprises:
imposing a lower bound to the style count for each cell of the plurality of cells.

14. The non-transitory computer-readable medium of claim 12, wherein the allocating the overall style count target among the plurality of cells further comprises:
imposing an upper bound to the style count for each cell of the plurality of cells.

15. The method of claim 1, the list including a data file received and stored at the server system.

16. The computer system of claim 6, the list including a data file received and stored at a server system.

17. The non-transitory computer-readable medium of claim 11, the list including a data file received and stored at a server system.

18. The method of claim 1, the assigning the one or more launch dates including:
querying, by the optimization engine, existing data corresponding to a previous season;
receiving, by the optimization engine, at least one adjustment to the existing data; and
outputting, by the optimization engine, the adjusted data in a launch schedule.

19. The computer system of claim 6, the assigning the one or more launch dates including:
querying, by an optimization engine, existing data corresponding to a previous season;
receiving, by the optimization engine, at least one adjustment to the existing data; and
outputting, by the optimization engine, the adjusted data in a launch schedule.

20. The non-transitory computer-readable medium of claim 11, the assigning the one or more launch dates including:
querying, by an optimization engine, existing data corresponding to a previous season;
receiving, by the optimization engine, at least one adjustment to the existing data; and
outputting, by the optimization engine, the adjusted data in a launch schedule.

\* \* \* \* \*